Nov. 15, 1966  C. B. DE HUFF  3,286,164
SYSTEMS FOR DETECTION AND AUTOMATIC REGISTRATION OF
PREIGNITION IONIZATION POTENTIALS IN INTERNAL
COMBUSTION ENGINES
Filed May 18, 1962  5 Sheets-Sheet 1

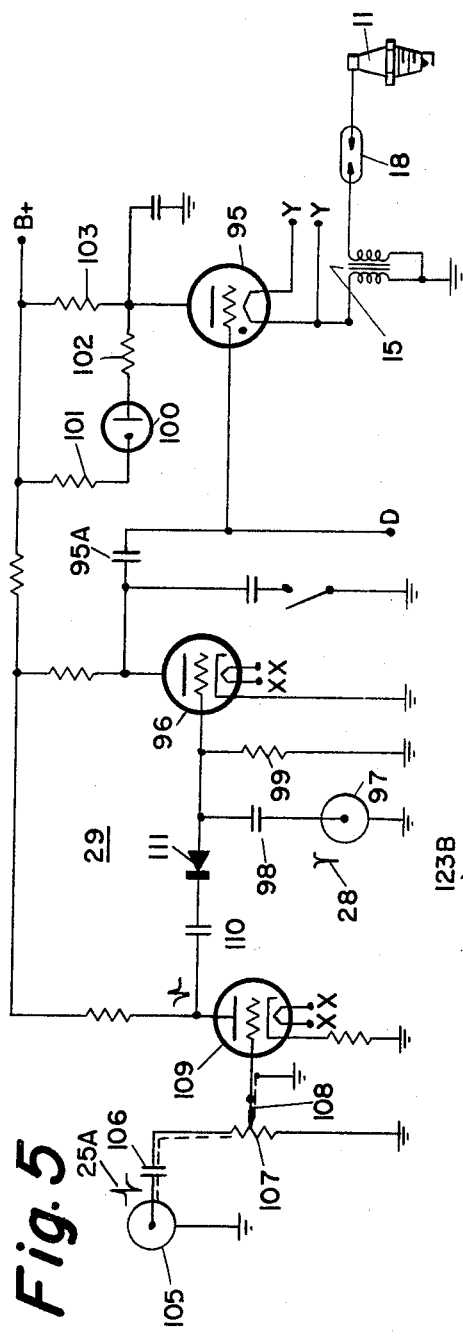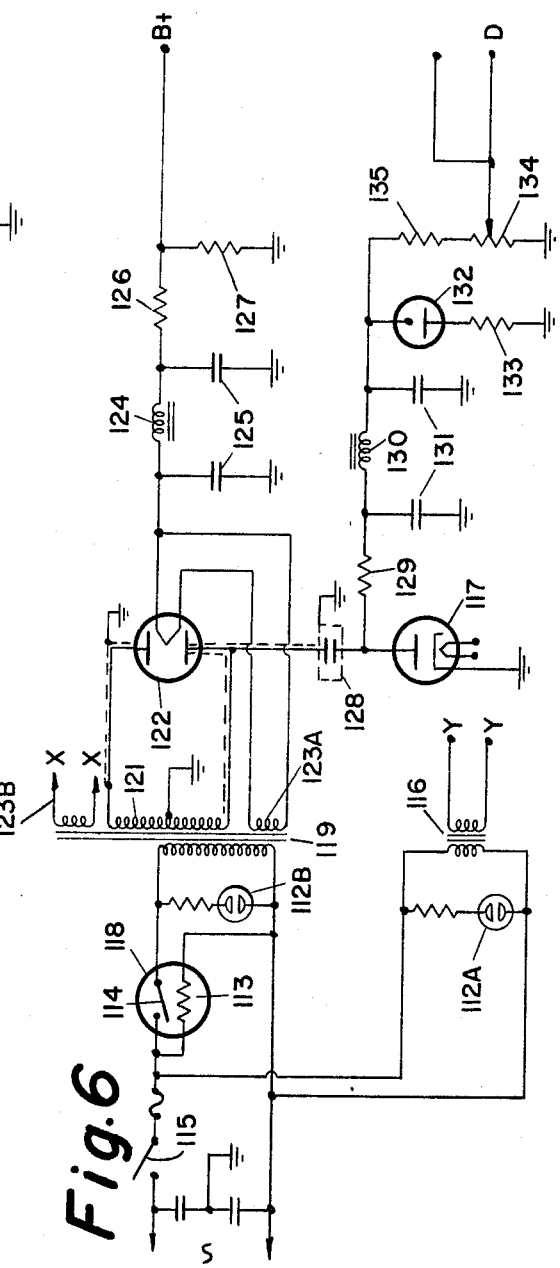

United States Patent Office

3,286,164
Patented Nov. 15, 1966

---

3,286,164
SYSTEMS FOR DETECTION AND AUTOMATIC REGISTRATION OF PREIGNITION IONIZATION POTENTIALS IN INTERNAL COMBUSTION ENGINES
Charles B. De Huff, Pitman, N.J., assignor to Mobil Oil Corporation, a corporation of New York
Filed May 18, 1962, Ser. No. 195,879
11 Claims. (Cl. 324—16)

This invention relates to systems for determining the preignition characteristics of interal combustion engine fuels and particularly relates to systems for detecting and counting the preignitions which may occur in an internal combustion engine used for testing fuels and lubricants.

In accordance with one aspect of the present invention, the plug normally used to ignite the fuel charge compressed in the combustion chamber of the engine is also used as a detector of ionization occurring in said chamber. There is thus avoided any modification of the geometry of such chamber which might affect combustion conditions and so impair or invalidate the tests.

Further in accordance with the invention, the pulse-counter or other voltage-responsive device connected to the ionization detector is controlled by gating pulses which are derived from the position of the piston of the engine, as by electromagnetic transducers in preselected position relative thereto, and which may be timed to exclude the counting or other registration of ionization voltages occurring upon normal ignition and also of firing voltages when the plug is of the high-tension spark-plug type.

Also in accordance with the invention, the high voltage for firing of the plug when of the spark-plug type is accurately and stably timed by a firing pulse generated upon termination of the aforesaid gate pulse so to permit checking for preignition up to within a fraction of one degree of the normal ignition time of the engine cylinder being checked.

Also in accordance with the invention, when the plug is of the spark type, its low-impedance, high-voltage source is isolated during the preignition period from the high-impedance pulse-counter or equivalent by a spark gap in the high-voltage supply lead to the plug. Such discontinuity in the high-voltage connection disappears momentarily when the air gap is broken down by a high-voltage firing pulse.

Also in accordance with the invention, a low stable voltage is constantly applied to the plug ionization-detector via a low-voltage connection from the pulse-counter to the plug to provide a continuous electrical charge on the detector and so properly activate it for detection of ionization. For protection of the pulse-counter from high voltage as appearing at the spark-plug for firing, the aforesaid low-voltage connection from the pulse-counter to the plug includes an attenuating impedance of high magnitude.

The invention further resides in the systems and components thereof having features of combination and arrangement hereinafter described and claimed.

For a more detailed understanding of the invention, reference is made in the following description of a preferred embodiment thereof to the accompanying drawings in which:

FIG. 5 is a circuit diagram of a preferred form of the electronic-ignition system of FIG. 1;

FIG. 6 is a circuit diagram of a suitable power supply for the ignition system of FIG. 5;

Figure 1:
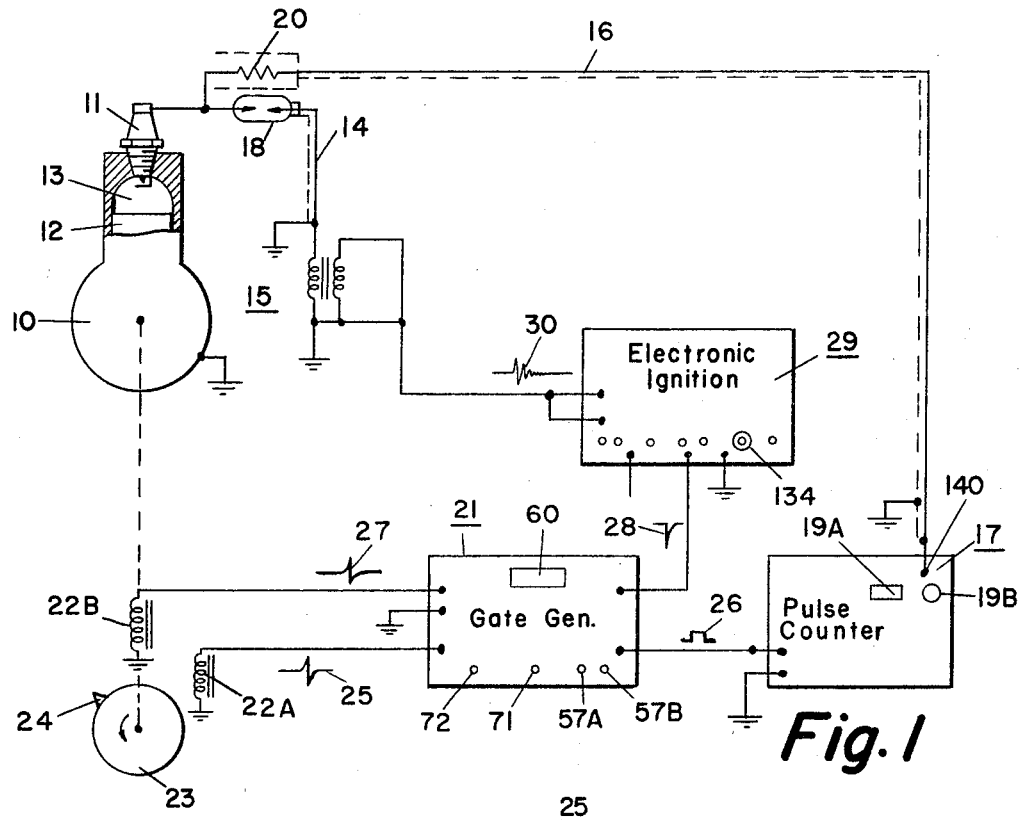
FIG. 1 is a block diagram of a system for the detection and automatic registration of the number of precombustion occurrences at the spark-plug location of an internal combustion engine.

Referring to FIG. 1, the engine 10 is exemplary of an internal combustion engine of the type in which the compressed fuel charge is fired at the end of a compression stroke by high voltage applied to the ungrounded or live terminal of a spark-plug 11. However, ignition of the charge may occur before the end of the compression stroke because of presence of glowing deposits or hot spots in the combustion chamber 13 formed by the top of the piston 12 and the upper wall structure of the engine cylinder. Such preignition, due to heating of the deposits to ignition temperature by the heat of compression of the fuel charge, causes rough and inefficient operation of the engine, and may result in catastrophic engine failure.

Combustion of hydrocarbons is productive of ionization voltages which are of small amplitude and low frequency compared to the high voltage applied for normal firing of the fuel charge: for example, the ionization signals may be of the order of 0.1 volt whereas the firing voltage is of the order of thousands of volts. The detection and recording of these small voltages, without modifying the construction or operating conditions of the combustion chamber and without disturbing or being disturbed by the high-firing voltage, has presented problems which previously have not been satisfactorily solved.

In the system of FIG. 1, the live terminal of the plug 11, in addition to being connected by the high-voltage lead 14 to an ignition coil 15 or equivalent high-voltage source, is also connected by lead 16 to a sensitive voltage-responsive device 17, specifically an electronic pulse-counter which also applies to the plug a constant potential of such polarity as to produce a positive pulse when ionization occurs. Because of the negative potential constantly applied to the plug from the power supply of the counter, the plug 11 serves as an ionization detector. Since this plug is present for normal firing purposes, its additional use as an ionization detector involves no change in the shape or dimensions of the combustion chamber and does not introduce any factor making the test conditions different from those existing during normal operation of the engine. To avoid attenuation of the small preignition ionization voltages by the low-impedance shunting effect upon the ionization gap of the direct-connected high-voltage source 15, an air-gap device 18 is interposed in the high-voltage lead 14. Except when broken down by the high-voltage firing pulse, this air-gap is of extremely high impedance and so effectively isolates the low-impedance source 15 from the plug 11 and the sensitive voltage-responsive device 17. With the source 15 so isolated, the response of the device 17 to the weak preignition ionization potentials detected by the plug 11 is made possible.

When the ignition coil 15 is energized at the end of the compression stroke, the resulting high voltage produced by it breaks down the air gap 18 and the spark plug 11 in usual manner produces a spark within the combustion chamber. To protect the sensitive voltage-responsive device 17 from the high voltage then momentarily appearing at the ungrounded terminal of the spark plug, there is included in the low-voltage lead 16 a high impedance 20 such as a resistance of 10 megohms or more.

Preferably both the air-gap device 18 and the high resistance 20 are disposed closely adjacent the spark-plug 11 and their leads 16 and 14 are in grounded shields. This minimizes any pickup of the firing voltage by lead 16 of the voltage-sensitive device 17.

In the system as thus far described, the device 17 responds not only to the preignition ionization pulses but also to the normal ionization pulses appearing after firing and to the attenuated high-voltage ignition pulses. Consequently, the device 17 would not give a count representative of the number of times that preignition may have occurred in a given period of operation of engine 10. To exclude from the count all pulses except those due to preignition ionization, the counter 17 is electronically switched "on" and "off" by gating pulses 26, each beginning suitably in advance of the firing time and terminating at the firing time. Thus, in each engine cycle only those impulses which occur before ignition are included in the count as registered, for example, by the electromechanical register 19A and the glow-transfer counter tube 19B.

Figure 2A:
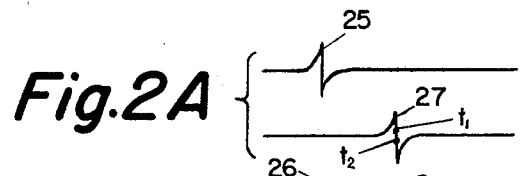
FIGS. 2A–2E are dual-trace oscillograms referred to in discussion of the operation of the system of FIG. 1 and its components.
Figure 2B:
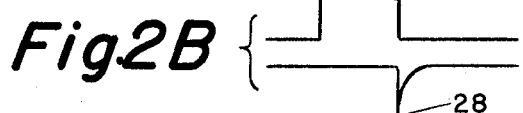

In the system shown in FIG. 1, the gating pulses 26 are produced by gate-generator 21 which in each cycle of the engine is triggered "on" and "off" by pulses 25, 27, the latter set to occur at normal ignition time for the engine cylinder being checked and the former set to occur when the piston is say about 90° (crankshaft position) in advance of ignition time. Specifically, these pulses are generated by pickup device 22A, 22B associated with the disc 23 or other element rotating in synchronism with movement of piston 12. For a four-cycle engine, the disc may be coupled to the valve cam shaft, and for a two-cycle engine, it may be coupled to the piston crankshaft. In both cases, the disc 23 makes one revolution per engine cycle. Preferably and as shown, each of the pickup devices includes a coil or winding about a magnet core which is disposed adjacent the disc 23 and in the path of an armature 24 or equivalent flux-modifying means rotating with the disc. The angular position of pickup device 22A may be adjusted such that when the piston is about 90° in advance of its position at normal ignition timing, a pulse 25 is supplied by it to one input circuit of the gate-generator 21 to start a gating pulse 26 and so condition the pulse-counter 17 for recognition of a preignition ionization that may occur in the corresponding cycle of the engine. The angular position of the second pickup device 22B may be adjusted such that when the piston is in position at normal ignition timing, a pulse 27 is supplied by device 22B to another input circuit of the gate-generator 21 to terminate the gating pulse 26 and so prevent the pulse-counter 17 from responding either to the ignition voltage or to ionization voltages due to normal combustion. The time relation between a pair of pickup pulses 25, 27 and the resulting gating pulse 26 is shown in FIGS. 2A, 2B which are reproductions of oscillograms taken at test points later herein referred to.

Figure 2C:
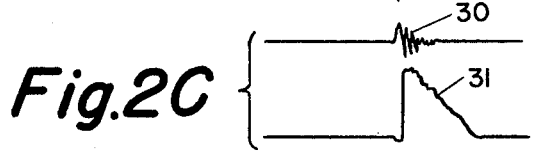
Figure 2D:
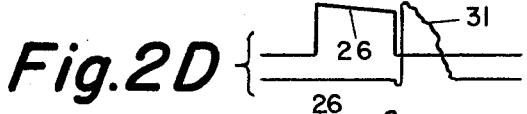
Figure 3:
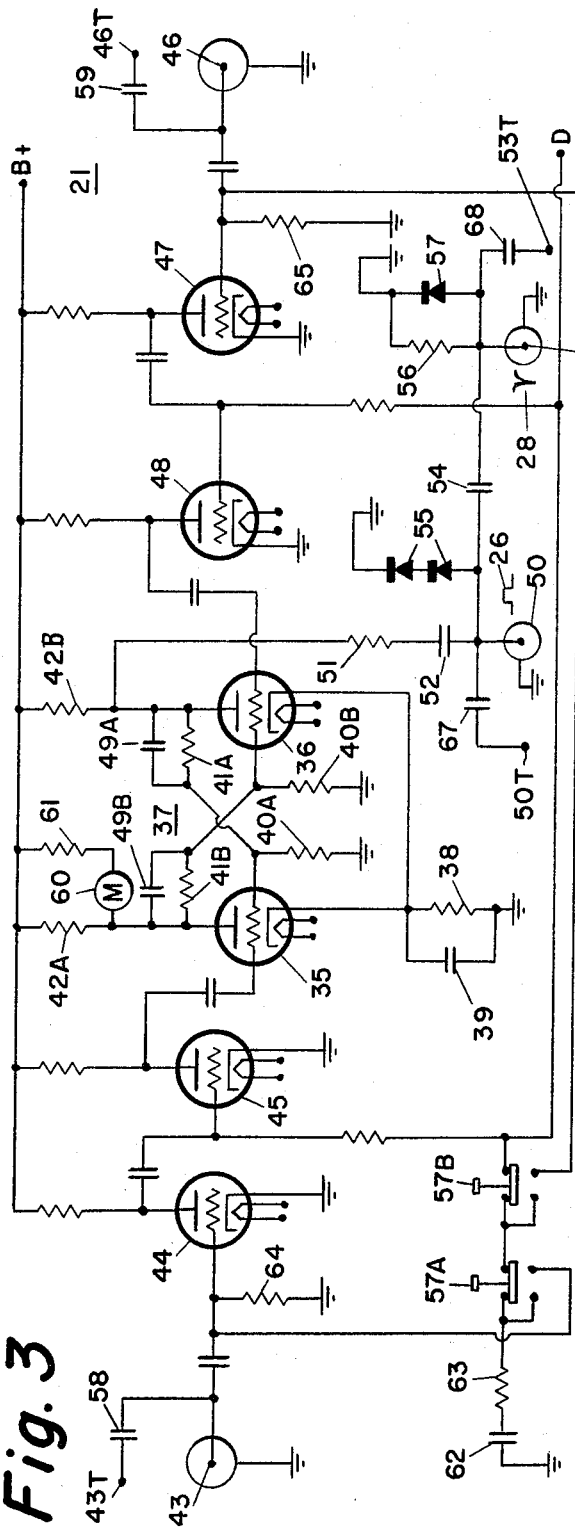
FIG. 3 is a circuit diagram of a preferred form of gate-generator of FIG. 1.

Concurrently with termination of a gating pulse 26, the gate-generator 21 also produces a sharp pulse 28 (FIG. 2B) which as applied to the electronic ignition system 29 effects excitation of the ignition coil 15. The gate-generator circuitry, later described in connection with FIG. 3, is such that the gating pulse 26 terminates at point $t_1$ of the second input pulse 27 and that the firing pulse 28, a differentiation of the negative-going termination of gating pulse 26, is effective at point $t_2$ of that same pulse. These two points $t_1$, $t_2$, are on the steep intermediate portion of the pulse 27 which insures high accuracy of the firing time and high stability of the extremely short-time interval between the termination of the gating impulse and the firing impulse. Such high accuracy and stability is not insured with the usual ignition arrangements using cam-operated timer contacts and distributor switches. With them, to avoid registration of false counts, the gate must be closed much earlier, with the result that preignitions occurring immediately prior to ignition cannot be detected. When a firing pulse is applied to the electronic ignition system 29, the primary winding of the ignition coil 15 receives a brief unidirectional current pulse. This current is of such polarity and the windings of the ignition coil are so poled that the resulting high-voltage pulse is of negative polarity. This high voltage breaks down the air-gap 18 and the spark-gap within the combustion chamber producing the spark. The resulting normal combustion of the fuel charge produces ionization of the hydrocarbon mixture. By reason of the negative potential constantly applied to cable 16 from the power supply of counter 17, there is produced a positive ionization voltage pulse exemplified by curve 31 in the lower portion of FIG. 2C. As shown in FIG. 2D, the normal ionization pulse 31 occurs after the gating pulse 26 has terminated so that it is not registered by the pulse-counter 17.

Figure 2E:
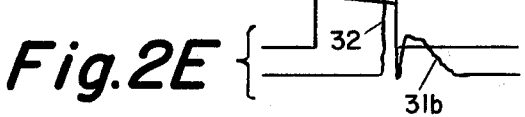

If, however, preignition occurs, the termination of the gating pulse 26 is preceded, as shown in FIG. 2E, by a positive preignition ionization pulse 32 which is registered by the pulse-counter 17. The subsequent weaker positive ionization pulse 31b, incident to further combustion resulting from firing of the plug, is not registered because occurring after termination of the gating pulse 26. Although the system described is primarily intended for use with a test engine in determining the characteristics of fuel mixtures and lubricants, it may, of course, be used in general for testing the combustion characteristics of internal combustion engines in any of various mobile and stationary services.

A suitable and preferred form of gate-generator 21 is schematically shown in FIG. 3. The two triodes 35 and 36 which may have a common envelope are included in a bistable multivibrator circuit 37. The cathodes of both triodes are connected together and to ground through cathode resistor 38 which is shunted by capacitor 39. The grid of triode 35 is connected to ground through resistor 40A and to the anode of triode 36 through resistor 41A. Under steady state conditions, the grid voltage of triode 35 is negative with respect to its cathode and is a predetermined fraction of the anode voltage of triode 36. The grid of triode 36 is connected to ground by resistor 40B and to the anode of triode 35 by resistor 41B. Under steady state conditions, the grid voltage of triode 36 is positive with respect to its cathode and is a predetermined fraction of the anode voltage of triode 35.

Before the gate-generator 21 is turned "on" by a start pulse 25, the triode 36 is normally in conductive state and triode 35 is in non-conductive state. Upon application of a negative start pulse 25 to input terminal 46 of the gate-generator 21, the triode 36 is switched "off" and triode 35 is switched "on." They remain in such switched state until a stop pulse 27 is applied to the second input terminal 43 from the second pickup device 22B. This stop pulse as amplified by the two-stage amplifier comprising triodes 44, 45 is applied as a negative pulse to the grid of triode 35. By multivibrator action, triode 36 is switched back to its original "on" state and triode 35 is restored to its original "off" state. The two amplifier stages 44, 45 and 47, 48 for the two input sides of the multivibrator need not be further described since they are conventional capacitor-coupled resistance amplifier stages.

The circuit for deriving gating pulses 26 and firing pulses 28 from the multivibrator section of the gate-generator is now described. The anode of the triode 36 is connected to the gating-pulse output terminal 50 through the serially-connected resistor 51 and capacitor 52. The terminal 50 is also connected to the firing-pulse output terminal 53 through capacitor 54 and to ground through the diodes 55, 55. The firing pulse terminal 53 is connected to ground through the resistor 56 and diode 57 in parallel. When triode 36 is switched "off" by a start pulse 25, the rise in its anode voltage charges the capacitors 52 and 54 in a path including resistor 51 and diode 57, causing the potential of terminal 50 to rise to a relatively positive value but clamped to ground potential by action of the diodes 55, 55. The leading edge of a positive gating pulse 26 is thus formed. No appreciable change in voltage occurs at this time at output terminal 53 due to differentiation by resistor 56 and capacitor 54 together with clipping action by diode 57. Until the next stop pulse is received, the output terminal 50 remains at substantially fixed positive potential due to the long time constant of the discharge path and the output terminal 53 remains at ground potential.

When the triode 36 is switched "on" by the next stop pulse 27, the drop in its anode voltage causes the capacitors 52, 54 to discharge in a path including the resistors 51 and 56. The potential of terminal 50 is thus dropped to a high negative value with respect to ground because of the clamping action of diodes 55 to form the trailing edge of a gating pulse 26. The momentary flow of the discharge current through a resistor 56 is in such direction that a negative pulse 28 appears at the firing-pulse output terminal 53. Because of the indicated poling of diode 57, the resistance presented by it to the discharge current is high compared to that of the resistor 56 in shunt to it. It is to be noted that the timing of the firing pulse is accurately and suitably predetermined, which is not the case in the conventional systems using cam-operated timer contacts and distributor heads.

The meter 60 connected in series with resistor 61 across one of the load resistors 42A or 42B of the multivibrator triodes provides a visual indication of whether the gate is open or close. With the meter in circuit as shown in FIG. 3, it should indicate a low reading when the triode to which it is connected is non-conductive and a high reading when that triode is conductive for steady state condition. When the engine is running, the gate output will normally be positive for 90° of the engine cycle and negative for the remainder of the cycle: the meter will show a low reading approximating the average of the voltage drop across resistor 92A. If, by chance triode 36 is "off" and triode 35 "on" in steady state condition, the first start pulse will have no effect since its function is to switch "off" the triode 36 which is already "off." The following stop pulse will initiate gate action by switching triode 35 to "off." This is because only a negative pulse arrives at the multivibrator grid from the original positive and negative signal due to zero biasing of amplifiers 44 and 47 and negative biasing of amplifiers 45 and 48.

As shown in FIG. 3, when the switches 57A, 57B are in their normal upper position, they complete a circuit for charging of capacitor 62 through resistor 63. When switch 57A is depressed to its lower position, it completes a path for discharge of capacitor 62 through the grid resistor 64 of triode 44 to simulate a start pulse 25. When switch 57B is momentarily depressed to its lower position, it completes a path for discharge of capacitor 62 through the grid resistor 65 of the opposite triode 47 to simulate a stop pulse 27. The switches 57A, 57B may be used to test the functioning of the gate-generator 21 when the engine 10 is not in operation.

The output waveforms of the gate-generator under actual or simulated conditions may be checked by connecting an oscilloscope to the test output terminals 50T, 53T. These test terminals are respectively connected to output terminals 50, 53 by coupling capacitors 67, 68. With the engine in operation, the functioning of the pick-up devices 22A, 22B may be checked by connecting an oscilloscope to the test terminals 43T, 46T of the gate-generator. These test terminals are respectively connected to the input terminals 43, 46 of the gate-generator through the coupling capacitors 58, 59.

Figure 4:
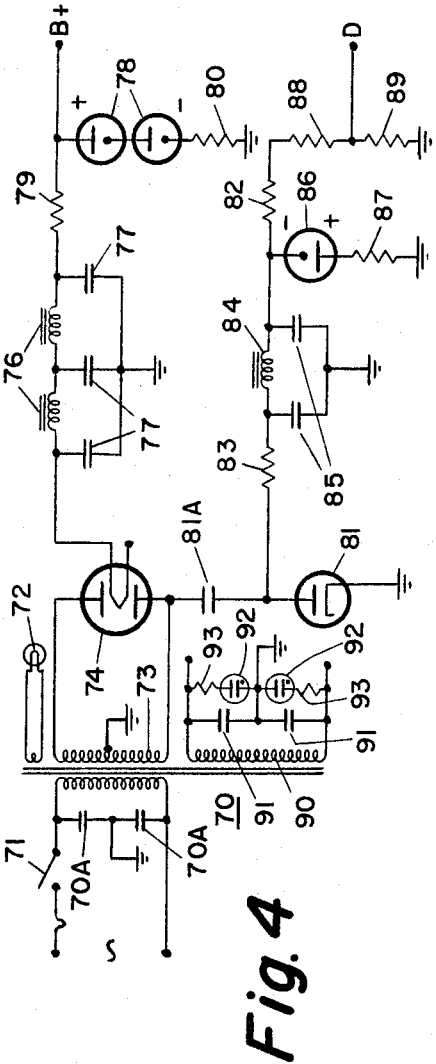
FIG. 4 is a circuit diagram of a suitable power supply for the gate-generator of FIG. 3.

A suitable power supply for the gate-generator 21 is shown in FIG. 4. The line switch 71 which controls energization of the power transformer 70 and the indicator 72 supplied from one of the secondary windings of the transformer are panel-mounted, FIG. 1. The high-voltage secondary winding 73 of the power transformer has a ground center-tap and its high-voltage terminals are connected to the anodes of a full-wave rectifier tube 74. The output circuit of the rectifier tube includes a filter comprising inductances 76, 76 and capacitors 77. The output voltage of the filter is stabilized by the regulator tubes 78 connected to the final filter section through resistor 79 and to ground through resistor 80. This portion of the power supply is a conventional D.C. power supply with a capacitor input, double $\pi$ filter and voltage-regulator tubes. Another portion of the power supply for providing a negative D.C. voltage is now described.

One terminal of the high-voltage secondary windings 73 is also connected to the anode of a shunt-connected half-wave rectifier tube 81 through a coupling capacitor 81A. The output circuit of this rectifier includes a filter comprised of resistor 83, inductance 84 and capacitors 85. The negative output voltage of the filter is stabilized by the reversely poled regulator tube 86 connected to ground through resistor 87. The resistors 82, 88, 89 form a voltage-divider providing at terminal D a suitable negative voltage for biasing the grids of the second-stage amplifier tubes 45, 48 of the gating-generator and for charging capacitor 62 of the reset circuit.

Other features of the power supply for the gate-generator 21 are now described. The cathode-heating current of all tubes of the gating-generator and its power supply are supplied from the secondary winding 90 of the power transformer 70. The common terminal of the capacitors 91, 91, serially-connected across winding 90, is connected to ground to eliminate transient interference from the amplifier and multivibrator circuits thereby to preclude spurious gate operation. Voltage break-down between the heater and cathode of the multivibrator tubes 35 and 36 is effectively prevented by shunting each of the capacitors 91 with a small neon tube 92 in series with a high resistance 93. Capacitors 70A, 70A serially-connected across the primary of transformer 70, with their common terminals grounded, serve as a filter for transients on the A.C. power lines.

A suitable and preferred form of electronic ignition system 29 is now described. Referring to FIG. 5, the primary winding of the ignition coil 15 is included in the cathode return circuit of a thyratron tube 95 such as a 6014/C1K. The grid of tube 95 is coupled to the anode of driver triode 96 by capacitor 95A. The grid of the driver tube is connected to the input terminal 97 through capacitor 98 and to ground through resistor 99. When a negative firing pulse 28 is supplied from the gate-generator 21 to input terminal 97, the resulting output of driver tube 96 as applied to the grid of the thyratron causes the latter to fire. The resulting current surge through the primary of the ignition coil induces in its secondary winding a high voltage which, as above described, causes the spark plug 11 to fire.

To check functioning of the thyratron 95 by an inexpensive panel-mounted indicator, there is provided a small neon bulb 100 which is connected in series with resistors 101, 102 across the load resistor 103 of the thyratron. Each time the thyratron is fired, the resulting voltage drop across the load resistor 103 causes the neon bulb 100 to flash.

The thyratron 95 may alternatively be fired by the output of a pickup device similar to 22A, 22B rather than a gate-generator pulse. In such case, the pickup applies a pulse 25A to the input terminal 105 of the electronic ignition system 29. This terminal is connected through capacitor 106 to a potentiometer 107 whose contact 108 is connected to the grid of a pre-amplifier tube 109. When a pulse 25A is applied, the negative swing of the resulting output pulse of tube 109 is applied to the grid of driver tube 96 through the coupling capacitor 110 and diode 111 so to produce a positive output pulse of the driver tube for firing of the thyratron. The positive swing of the A.C. output pulse of the pre-amplifier tube 109 is blocked by the diode 111. This alternative mode of controlling the electronic ignition system is provided so that the ignition system may be used, even if preignition counting and gating are not required, in lieu of a conventional ignition system employing mechanical breaker points, a battery and an ignition coil.

A suitable power supply for the electronic ignition system 29 is shown in FIG. 6. When the line switch 115 is closed, the primary winding of the filament transformer 116 is energized to supply current to the heater of the thyratron tube 95 which requires preheating before application of its anode voltage. The panel-mounted neon bulb 112A indicates this "on" condition. The closure of the line switch 115 also energizes the heater coil 113 of the time-delay relay 118. After an interval, the thermally-actuated contact 114 of the relay closes to excite the main power transformer 119 and the panel-mounted neon tube 112B. The high-voltage secondary winding 121 of transformer 119 has a center-tap connection to ground and its high-voltage terminals are connected to the anodes of a full-wave rectifier tube 122 and secondary winding 123B supplies the heaters of triodes 96 and 109 and of bias rectifier tube 117. The directly-heated cathode of rectifier tube 122 is supplied from secondary winding 123A of transformer 119. The output circuit of rectifier tube 122 includes a filter comprising inductance 124 and capacitors 125. The resistors 126, 127 connected in series across the output of the filter provide a potential-divider with an intermediate B+ terminal for supplying the anode current and voltages of the tubes of the electronic ignition system 29.

One of the high-voltage terminals of secondary winding 121 of transformer 119 is connected through capacitor 128 to the anode of the bias rectifier tube 117. This is a half-wave rectifier with its cathode connected to ground for shunt rectification. The rectifier output circuit includes a filter comprising resistor 129, inductance 130 and capacitors 131. The negative output voltage of the filter is stabilized by the regulator tube 132 in series with resistor 133. The potentiometer 134 in series with resistor 135 across the voltage-stabilized filter provides for adjustment of the negative grid voltage for the thyratron to insure that it turns "off" each time after firing.

Figure 7:
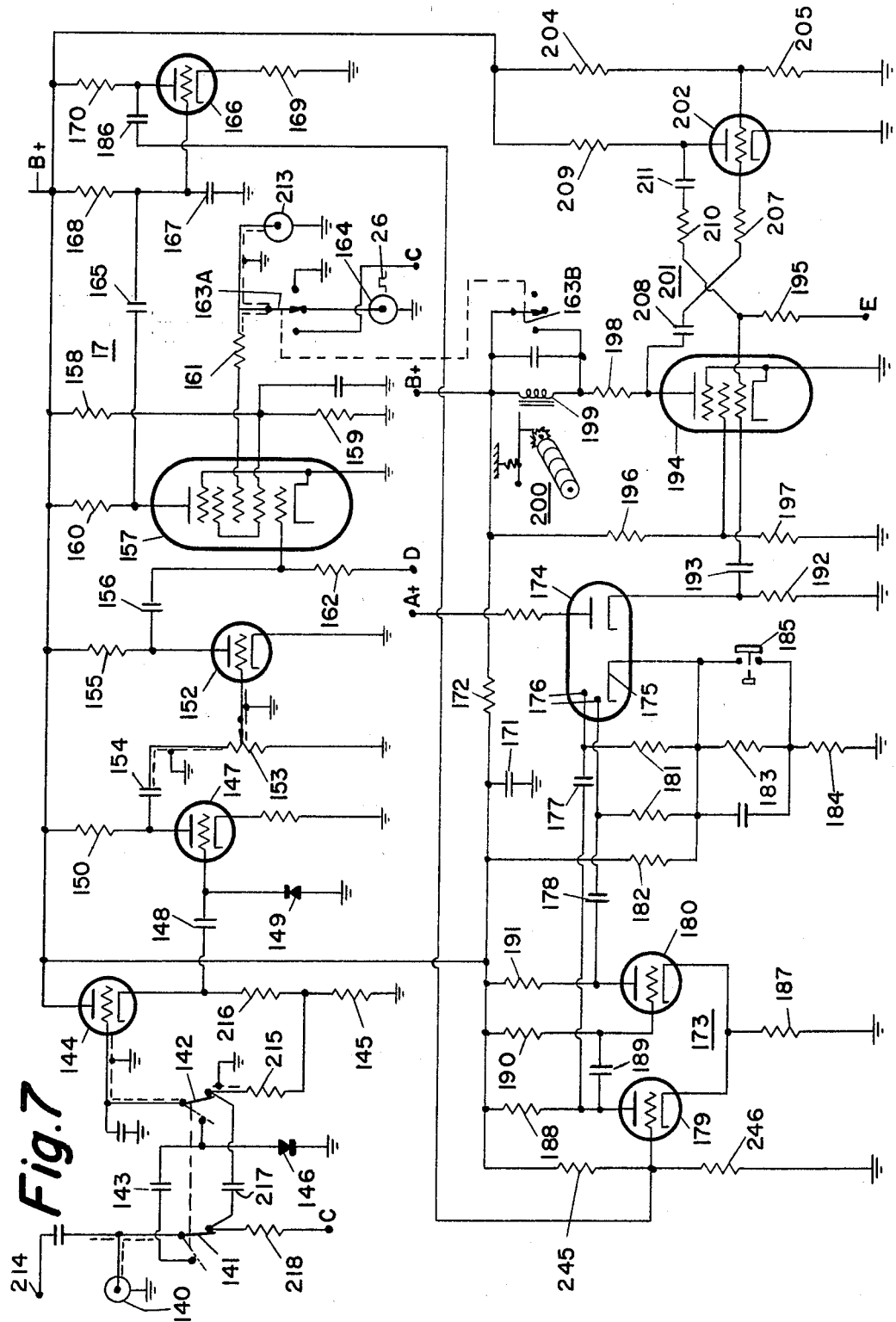
FIG. 7 is a circuit diagram of a preferred form of the pulse-counter of FIG. 1.

A suitable and preferred form of voltage-responsive device 17 for detecting and counting ionization pulses is shown in FIG. 7. The signal input terminal 140 is connected by cable 16 and resistor 20 (FIG. 1) to the ungrounded electrode of plug 11 or other ionization detector in the combustion chamber of engine 10. With the ganged switches 141, 142 in the full-line position shown, the ionization pulses are applied from terminal 140 through capacitor 217 to the grid of triode 144 which is connected as a cathode follower. The grid is self-biased to a small negative value with respect to the voltage drop across the cathode to ground resistance 145 whereas the cathode potential is the total drop across resistors 145 and 216. Thus, changes in grid voltage are faithfully reproduced at different impedance with no amplification at the cathode.

The cathode of triode 144 of counter 17 is connected to the grid of the second triode 147 through coupling-capacitor 148. The second amplifier stage including triode 147 affords relatively high voltage gain and inversion of the input signal because its load resistor 150 is of high magnitude and is between the anode and the source of anode supply voltage. The diode 149 from the grid of triode 147 to ground is so poled that the grid can rise to the peak value of a positive input signal but does not to any appreciable extent respond to a negative signal. The bias of tube 147 is also such that positive signals are amplified more than negative signals. Thus, an ionization signal as repeated by the first stage triode 144 and applied to the grid of the second stage triode 147 appears as a high-amplitude negative pulse at the anode of triode 147. Any desired fraction of this negative signal may be applied to the grid of the third triode 152 by adjustment of the contact of potentiometer 153 which is connected through capacitor 154 to the anode of the second stage triode 147.

The third amplifier stage including triode 152 is a high-gain stage, operating at zero bias to amplify negative signals, with its load resistor 155 in the anode circuit to effect further amplification and phase reversal of the negative output pulse of the second stage. The positive output pulses of the third stage are applied through capaci 156 to the #1 grid of a dual-control heptode 157, such as a 5915 tube biased below cut-off, in the fourth stage of the pulse-counter 17. The #5 grid (suppressor) and the cathode of tube 157 are connected to ground. The #2 grid (screen) and the #4 grid (screen) are connected to a point of fixed positive potential afforded by the potential-divider formed by resistors 158, 159 connected between ground and the B+ lead. The output of load resistor 160 of the heptode 157 is connected between its anode and the B+ lead.

With switch 163A in the center position shown, the #3 grid of dual-control tube 157 is connected through resistor 161 to the gate input terminal 164 of the pulse-counter 17. Except during application of a positive or zero gating pulse 26 to the input terminal 164, the gate tube 157 does not produce any output signal in its anode circuit, even though for any reason a positive signal appears at its #1 grid, because held far below cut-off by the negative portion of gating pulse 26. When a positive gating pulse 26 is applied to the #3 grid of tube 157, that tube is conditioned to produce a negative output pulse when a positive signal is also applied to its #1 grid. The gating pulse 26 by itself produces no change in the anode voltage of the gated tube 157 because of the cut-off bias on the #1 grid. Coincidence of positive signals on the #1 and #3 grids of tube 157 is necessary for producing a negative output pulse. With switch 163A set to its right-hand position, the #3 grid of tube 157 is connected to ground, thus permitting the counter to register all input signals so that it may be used for other applications and for tests. With switch 163A set to its left-hand position, the #3 grid of tube 157 is biased to cut-off, thus to shut off counting without need to turn off the counter's power supply: this switch position is useful for test purposes as later described.

Now reverting to description of the counter 17 as used for detection and counting preignitions: since the gating pulse 26 is normally applied only for the time interval during which preignition may occur, tube 157 in effect blocks passage of any signal occurring outside of that time interval. The output negative pulses produced are therefore valid preignition ionizations permitted by tube 157 to pass it for counting by any suitable means. In the preferred arrangements shown, these selected negative pulses as appearing in the anode circuit of gate tube 157 are applied through capacitor 165 to the grid of triode 166. The standby potential of this grid with respect to ground is determined by capacitor 167 which is charged from the B+ lead through a high resistance 168 to provide a slightly positive clamp bias. The output or load resistor 170 of tube 166 is connected between its anode and the B+ lead so that the negative output pulses of the gate tube 157 produce large, sharp positive output pulses in the anode circuit of tube 166.

Figure 9:
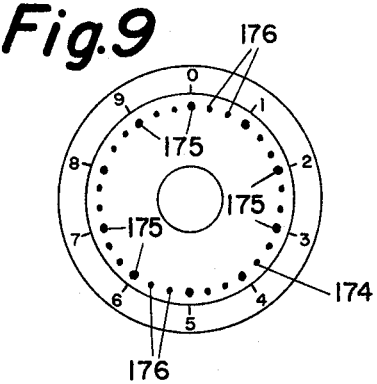
FIG. 9 shows more detailed circuit connections of the counting tube of FIG. 7.

As now explained, each output pulse of gate tube 157 as inverted by tube 166 is applied through a wave-shaping amplifier 173 to a counter-tube 174 which may be of the GC10B type (FIGS. 7 and 9). The tube and circuit are per se known but are briefly described for completeness. This tube has ten glow electrodes 175 visible from the front face of the tube and arranged in a circular array concentric with an annular dial plate having the numerals 0 to 9 respectively disposed adjacent the corresponding glow electrode (FIG. 9). On each of opposite sides of each glow electrode is a transfer electrode: i.e., there are two transfer electrodes 176 between each glow electrode and the next. These two transfer electrodes are respectively connected through capacitors 177, 178 to the anodes of triodes 179, 180 (FIG. 7) of the shaping amplifier 173. These triodes may be those of a tube of the 5751 type. These transfer electrodes 176 are each connected through a resistor 181 to an intermediate tap of voltage-divider formed by the resistors 182–184 which are connected in series between the B+ lead and ground. The intermediate resistor 183 is normally shunted out of circuit by switch 185. The glow electrodes 175 are all connected to the tap-point of this voltage-divider.

Each output pulse of the gated tube 157 as applied through tube 166 to the shaping amplifier results in the application of negative and positive pulses to the transfer electrodes. This causes effective transfer of the glow discharge from one glow electrode 175 to the next in clockwise direction. If the glow is not at the zero count point at the beginning of a test, it may be brought to that point by momentarily depressing the reset switch 185 one or more times.

The normal stepping pulses for the counting tube 174 are derived by the shaping amplifier from the output pulses of tube 166. To that end, the grid of the first tube 179 of the shaping amplifier is coupled by capacitor 186 to the anode of tube 166. The positive cathode bias of tube 179 together with the potential of the cathode resulting from the voltage drop across resistor 187 causes tube 179 to operate at a bias value clamped slightly negative. The anode of tube 179 is connected through the load resistor 188 to the B+ lead. The negative output pulses of tube 179 are applied to one set of the transfer electrodes 176 of the counting tube 174 through capacitor 177 and are also applied through capacitor 189 to the grid of the second shaping amplifier tube 180. The grid of the second tube 180 is also connected to the B+ lead through a high resistance 190 and its bias is therefore clamped positive. The load resistor 191 of tube 180 is in its anode circuit to produce inverted output pulses (positive) which are applied through capacitor 178 to the other set of transfer electrodes 176 of the counting tube 174.

Thus, in the successive cycles of the engine 10 of FIG. 1, each time a preignition ionization voltage is produced at the firing plug, the glow discharge is transferred from one to the next electrode 175 of the counter-tube 174. Even when there are hot spots or hydrocarbon deposits in the combustion chamber, preignition may not occur in every engine cycle so that the count registered by the tube may proceed at random or varying rate. For every tenth count, whenever such occurs, there is flow of current through the counting tube 174 in a path including its cathode resistor 192. Thus, every tenth count as appearing at the cathode of tube 174 is applied through coupling capacitor 193 to the #1 grid of the pentode tube 194. This grid is also connected to a source of adjustable negative bias potential through a resistor 195. The cathode and #3 grid of tube 194 are connected to ground. The #2 grid of tube 194 is connected to a positive bias point afforded by the voltage-divider formed by resistors 196, 197. The anode circuit of tube 194 includes resistor 198 and the actuating winding 199 of an electromechanical counter 200.

For every tenth count displayed by tube 174, the units dial of the counter 200 is advanced to the next digit and this dial in turn and in known manner steps the next higher dial ahead one step at completion of its revolution. For most test purposes, a four-dial counter is sufficient since this, in conjunction with tube 174, permits reading of individual counts up to 99,999. It is to be noted that tube 174 is included in the circuit not merely to trigger the counter 200 but to increase the counting speed. Tube 174 can count at the rate of 4000 per second. The counter 200 can itself count only at the rate of 20 per second but having its "units" digits counting "tens" of the total number enables the combination of counter 200 and tube 174 to count at the rate of 200 per second which is sufficient to count the cylinder firings of an 8-cylinder, 4-cycle engine operating at 3000 r.p.m.

The filter comprising capacitor 171 and resistor 172 prevents the stepping actuation of counter 102 from affecting the input circuits of tube 174 and so introduce an extra or false "units" count by that tube.

To insure that the armature of the stepping magnet 199 of the counter 200 returns to proper position after each 10's count, the tube 194 is included in a monostable multivibrator circuit 201 including the triode 202. The grid of the normally "on" tube 202 is connected to a positive bias point afforded by the potential-divider formed by resistors 204, 205. This grid is also coupled to the anode of tube 194 through the resistance 207 and capacitor 208 in series. The anode of tube 202 is connected to the B+ lead through load resistor 209 and is coupled to the #1 grid of tube 194 through resistance 210 and capacitor 211 in series. Thus, when tube 194 is turned "on" to effect a stepping energization of magnet 199, this multivibrator goes through a cycle ending when the tube 194 is returned to its original "off" state and tube 202 is returned to its original "on" state.

When during engine adjustments or for other reasons it is desired temporarily to disable the counter 17, the gang switches 163A, 163B are thrown from their center position to the left. Switch 163A now applies a high-negative cut-off bias to the #3 grid of the gate tube 157 and switch 163B now short-circuits the actuating coil 199 of the counter 200. With switches 163A, 163B thrown to the right from the position shown, the functioning of the counter 17 can be checked without applying gating pulses to the input terminal 164. Test terminal 214 connected to the input terminal 140 of counter 17 is provided to permit checking, by an oscilloscope, of the waveform of the ionization pulses 31, 32. The terminal 213 is an input terminal for connection to an external switch, such as a pressure or vacuum-actuated switch responsive to pressure conditions of the engine or its components or auxiliaries.

The ganged switches 141, 142 in the input circuit of tube 144 of counter 17 to provide for selection either of ionization signals from an ionization detector such as plug 11 (FIG. 1) or of pulses from pickup devices such as transducers 22A, 22B. With these switches in the full-line or right-hand position for counting ionization signals, the grid of tube 144 is connected via switch 142 and through resistor 215 to a point of fixed positive potential in the cathode return circuit afforded by resistors 145, 216. The grid is also connected via switch 142, coupling capacitor 217 and switch 141 to the input terminal 140. The switch 141 also connects the input terminal 140 through resistor 218 to a source of high negative voltage. Thus, the spark-plug ionization detector 11 is constantly energized by the high negative voltage and the capacitor 217 feeds the ionization signals to the tube 144 which is connected as a cathode follower to minimize or eliminate ignition interference in the counter circuits.

With the switches 141, 142 thrown to the left-hand or dotted-line position, to count pulses from pickup devices such as 22A, 22B, the source of high negative potential is disconnected from input terminal 140; the grid-coupling capacitor 217 is replaced by grid-coupling capacitor 143 of more suitable value for the waveshape of the pulse pickup; and the grid of tube 144 is connected to the clipper diode 146 and disconnected from resistor 215 to protect diode 146 from the positive grid-bias otherwise applied thereto. The diode 146 eliminates the positive portion of the pickup signal which is a cause of double counting because of differentiation by capacitor 148 and diode 149.

Figure 8:
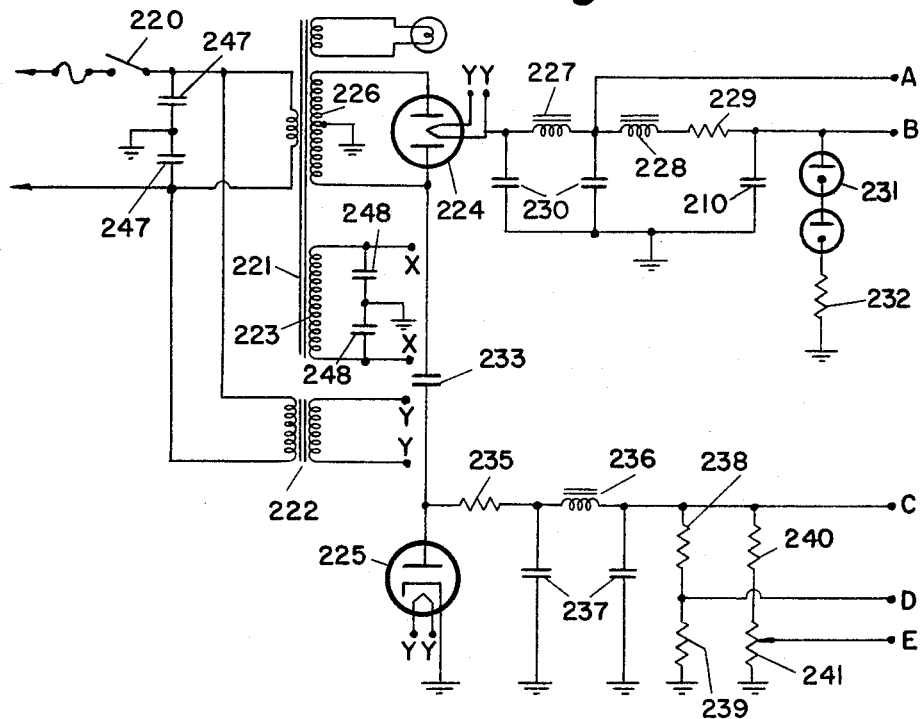
FIG. 8 is a circuit diagram of a suitable power supply source for the pulse-counter of FIG. 7.

A suitable power supply for the electronic counter 17 is shown in FIG. 8. When the line switch 220 is closed, the primary windings of the transformers 221 and 222 are energized. The secondary winding of transformer 222 supplies the cathode heating current of the rectifier tubes 224, 225 of the power supply. The secondary winding 223 of transformer 221 supplies the heater current for all tubes of the counter 17. The high-voltage winding 226 of transformer 221 has a grounded center-tap and its high-voltage terminals are connected to the anodes of the full-wave rectifier tube 224. The output circuit of tube 224 includes a two-section filter comprising inductances 227, 228, resistor 229 and capacitors 230. The first filter section provides a higher positive voltage supplied to the anode of the glow transfer counter-tube 174. The output voltage of the second filter section is stabilized by the regulator tubes 231 in series with resistor 232. The stabilized output voltage of the second filter section supplies the B+ voltage for the remainder of the tubes of counter 17. The anode of the shunt-connected bias rectifier tube 225 is connected through capacitor 233 to one of the terminals of the high-voltage secondary winding 226. The output circuit of tube 225 includes a filter comprised of resistor 235, inductance 236 and capacitors 237. The full negative output voltage of the filter is available for the test purposes above referred to: the bias for the #1 grid of the gate tube 157 is provided by the voltage-divider formed by resistors 238, 239; and the adjustable bias for the #1 grid of the tube 194 associated with counter 200 is provided by the voltage-divider formed by fixed resistor 240 and potentiometer 241. The two voltage-dividers are separate to prevent interaction of the circuits of tubes 157 and 194. The filter capacitors 247, 247 and 248, 248, particularly the latter, were found to be extremely important for the elimination of spurious counts due to power-line transients. As shown in FIG. 8, the capacitors 247, 247 are connected in series across the primary windings of the power transformers 221, 222 with the common terminal grounded. The capacitors 248, 248 are connected in series, with their common terminal grounded, across the transformer secondary winding 223 which supplies the heater current for the tubes of counter 17.

It shall be understood that although preferred forms of the gate generator, the pulse counter and the electronic ignition system of FIG. 1 have been illustrated and described in detail, other forms of these components may be used in the test system of FIG. 1.

It shall also be understood that the specific values of circuit components referred to in the accompanying description are given as illustrative of suitable values and are not limitive of the invention as defined in the appended claims.

What is claimed is:

1. A system for checking the preignition characteristics of fuels for an internal combustion engine comprising a firing plug therefor having a single insulated electrode utilized both for producing normal ignition and as a detector of preignition ionization, said electrode being sealed therein and extending into the combustion chamber of said engine, a high-voltage source connected to said electrode for producing said normal ignition, voltage-responsive means connected to an external terminal of said electrode of said firing plug, means for producing gating pulses timed to coincide with the terminal portions of successive fuel compression periods of said engine during which premature combustion may occur, and means for applying said pulses to said voltage-responsive means to de-sensitize it except during said periods for response thereof only to preignition ionization voltages appearing at said electrode.

2. A system for checking preignition occurrences in an internal combustion engine comprising a spark-plug having a single insulated electrode utilized both for normal firing and as a detector of preignition ionization, a high-voltage source connected to said electrode for producing said normal firing, voltage-responsive means connected to said insulated electrode of said spark-plug, means for producing square-wave gating pulses each timed to coincide with the terminal portion of a fuel compression period of said engine, means for applying said pulses to sensitize said voltage-responsive means only during said fuel compression periods for response only to preignition ionization voltages appearing at said electrode of the spark-plug, and means including a differentiation circuit for producing a sharp pulse derived from termination of each gating pulse and utilizing said sharp pulse to provide the firing voltage for said spark-plug.

3. A system for checking preignition occurrences in an internal combustion engine and comprising a spark-plug having a single insulated electrode utilized both for normal firing from a low-impedance high-voltage source and as a detector of preignition ionization, said high-voltage source connected to said electrode for producing said normal firing, a voltage-responsive device connected to said insulated electrode of said spark-plug, means for producing gating pulses each timed to coincide with the terminal portion of a fuel compression period of said engine, means for applying said pulses to sensitize said device for response only to preignition ionization voltages appearing at said spark-plug electrode during the fuel compression periods, and a spark-gap in the high-voltage connection to said spark-plug electrode from said high-voltage source to avoid shunting of said voltage responsive device by the low-impedance high-voltage source during said periods.

4. A preignition checking system comprising a spark-plug having a single insulated electrode utilized in an internal combustion engine for normal firing thereof and also as a detector of preignition ionization, a high-voltage source connected to said electrode for producing said normal firing, an electronic pulse-counter connected to the single electrode of said spark-plug, means for periodically sensitizing and de-sensitizing said counter comprising a generator for producing gating pulses each terminating when the position of the piston of said engine corresponds with the firing time of said spark-plug, means insuring recording of small amplitude pulses due to occurrence of preignition ionization comprising an air-gap in the high-voltage firing connection to said spark-plug, the de-sensitizing of said counter by termination of said gating pulses precluding recording of pulses corresponding with occurrence of firing voltage, and a high impedance in the connection between said pulse-counter and the spark-plug to insure firing of the plug and to protect the pulse-counter from damage by the high firing-voltage.

5. A preignition checking system comprising a spark-plug having a single insulated electrode utilized in an internal combustion engine both for normal firing and as a detector of preignition ionization, a high voltage source connected to said electrode for producing said normal firing, a pulse generator, means for periodically producing a pair of pulses respectively controlling said pulse generator to start a square-wave gating pulse at predetermined time in the fuel compression periods of the engine and to terminate the gating pulse, said pulse generator responding to termination of the gating pulse to produce an accurately timed firing pulse at the end of the fuel-compression periods, a pulse-counter connected to the single electrode of said spark-plug, means for applying the gating pulse to said pulse-counter so that said pulse-counter is conditioned by a gating pulse to record the spark-plug voltage in an interval preceding said firing pulse and during which premature combustion may occur, means insuring recording by said pulse-counter of small spark-plug voltages due to preignition ionization comprising an air-gap device in the high-voltage connection to the spark-plug to avoid attenuation of said ionization voltages by the shunting impedance of the source of said high voltage, and means comprising a high impedance in the connection between the spark-plug and the pulse-counter for insuring firing of the plug and for protecting the pulse-counter from damage by the high firing-voltage.

6. A preignition checking system comprising a spark-plug having a single high-voltage terminal utilized in an internal combustion engine both for normal firing from a low-impedance high-voltage source and as an ionization detector, said high-voltage source connected to said terminal for producing said normal firing, a connection from said high-voltage terminal of said spark-plug to a source of low stable D.C. potential to activate said plug for detection of ionization, a voltage-responsive pulse-counting means coupled to said low-voltage connection of said plug and intermittently responsive to ionization voltages produced by said spark-plug during normal ignition-on operation of the engine, means for producing square-wave gating pulses each timed to coincide with the terminal portion of a fuel-compression period during which permature combustion may occur in the engine, and means for applying said pulses to sensitize said voltage-responsive pulse-counting means for response only to preignition ionization signals produced by said spark plug.

7. A system as in claim 6 in which said low-voltage connection includes a high impedance to protect said voltage-responsive pulse-counting means against damage by the high-voltage periodically supplied to said spark-plug terminal for firing.

8. A system as in claim 6 in which an air-gap is included in series between said high-voltage source and said spark-plug terminal to minimize the low-impedance shunting effect of said source upon said voltage-responsive pulse-counting means in the interval between successive firings.

9. A system as in claim 6 additionally having means including a differentiation circuit for deriving a sharp pulse from termination of each of said gating pulses and utilizing said sharp pulse to energize said high-voltage source for firing of the plug.

10. A system as in claim 6 in which the voltage-responsive pulse-counting means comprises a high-speed electronic counter including a tube-indicator reading from 0 to 9 and a slow-speed electromechanical counter having cyclometer dials each reading from 0 to 9, means for actuating said electronic counter for each of the successive ionization signals, and means for actuating said electromechanical counter for every tenth actuation of said electronic counter.

11. A system as in claim 10 including filter means for suppressing transients including those due to actuation of said electromechanical counter and those in the power supply for said electronic counter and effective to prevent registration of false counts.

References Cited by the Examiner
UNITED STATES PATENTS

| | | | |
|---|---|---|---|
| 1,296,101 | 3/1919 | Meyer | 324—17 |
| 2,324,458 | 7/1943 | Peters | 324—16 |
| 2,517,976 | 8/1950 | Clarke | 73—35 X |
| 2,543,141 | 2/1951 | Vichnievsky | 73—35 |
| 2,607,215 | 8/1952 | De Boisblanc | 73—35 |
| 2,680,241 | 6/1954 | Gridley | 324—68 X |
| 2,785,215 | 3/1957 | Yetter | 324—16 X |
| 2,842,956 | 7/1958 | Uyehara | 324—15 |
| 2,941,396 | 6/1960 | Adams | 324—16 X |
| 3,030,799 | 4/1962 | Hopkins | 73—35 |
| 3,035,224 | 5/1962 | Whaley | 324—16 |
| 3,126,733 | 3/1964 | Heigl et al. | 73—35 |

WALTER L. CARLSON, *Primary Examiner.*

A. E. RICHMOND, *Assistant Examiner.*